(12) United States Patent
Sheng et al.

(10) Patent No.: US 9,449,371 B1
(45) Date of Patent: Sep. 20, 2016

(54) TRUE MOTION BASED TEMPORAL-SPATIAL IIR FILTER FOR VIDEO

(71) Applicant: PIXELWORKS, INC., Portland, OR (US)

(72) Inventors: Xiaojie Sheng, Shanghai (CN); Guohua Cheng, Shanghai (CN); Neil Woodall, Newport Beach, CA (US); Bob Zhang, Santa Clara, CA (US)

(73) Assignee: Pixelworks, Inc., Portland, OR (US)

( * ) Notice: Subject to any disclaimer, the term of this patent is extended or adjusted under 35 U.S.C. 154(b) by 133 days.

(21) Appl. No.: 14/199,623

(22) Filed: Mar. 6, 2014

(51) Int. Cl.
*G06K 9/40* (2006.01)
*G06T 5/00* (2006.01)

(52) U.S. Cl.
CPC .................................... *G06T 5/002* (2013.01)

(58) Field of Classification Search
CPC .... G06T 5/002; H04N 19/56; H04N 19/117; H04N 19/513; H04N 19/521; H04N 19/527; H04N 19/53; H04N 19/80
See application file for complete search history.

(56) References Cited

U.S. PATENT DOCUMENTS

| 2008/0204602 | A1 | 8/2008 | Beric et al. | |
| 2009/0153739 | A1* | 6/2009 | Hong | H04N 5/21 348/620 |
| 2009/0273716 | A1* | 11/2009 | Wu | H04N 19/117 348/607 |
| 2010/0232509 | A1 | 9/2010 | Incesu et al. | |
| 2011/0058610 | A1 | 3/2011 | Van Beek | |
| 2011/0242422 | A1* | 10/2011 | Hong | H04N 5/2176 348/614 |
| 2013/0177253 | A1* | 7/2013 | Batur | H04N 19/80 382/236 |

* cited by examiner

*Primary Examiner* — Phuoc Tran
(74) *Attorney, Agent, or Firm* — Marger Johnson

(57) ABSTRACT

To denoise video data, a temporal IIR filter is applied to video data. The temporally filtered frame is used as a guide to spatially filter the video data without introducing temporal artifacts. The spatially filtered frame can then be temporally filtered again using a temporal IIR filter. The results of the second temporal filtering can then be used as a guide to eliminate noise that the spatial filter did not eliminate.

16 Claims, 15 Drawing Sheets

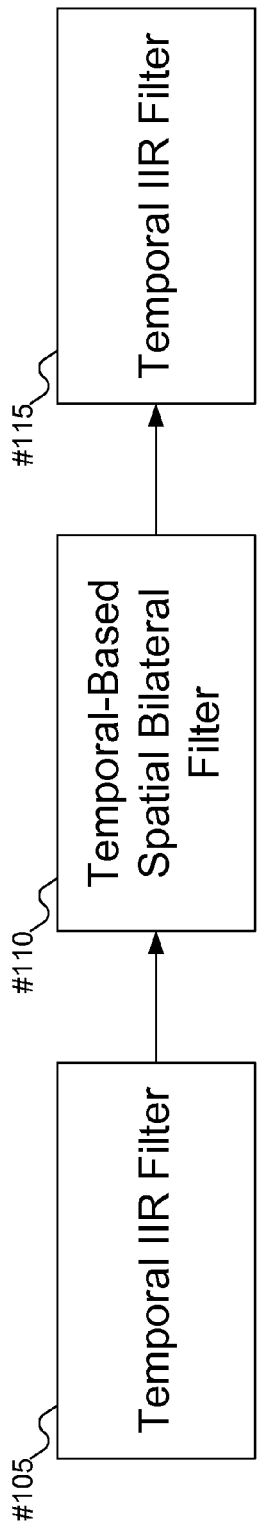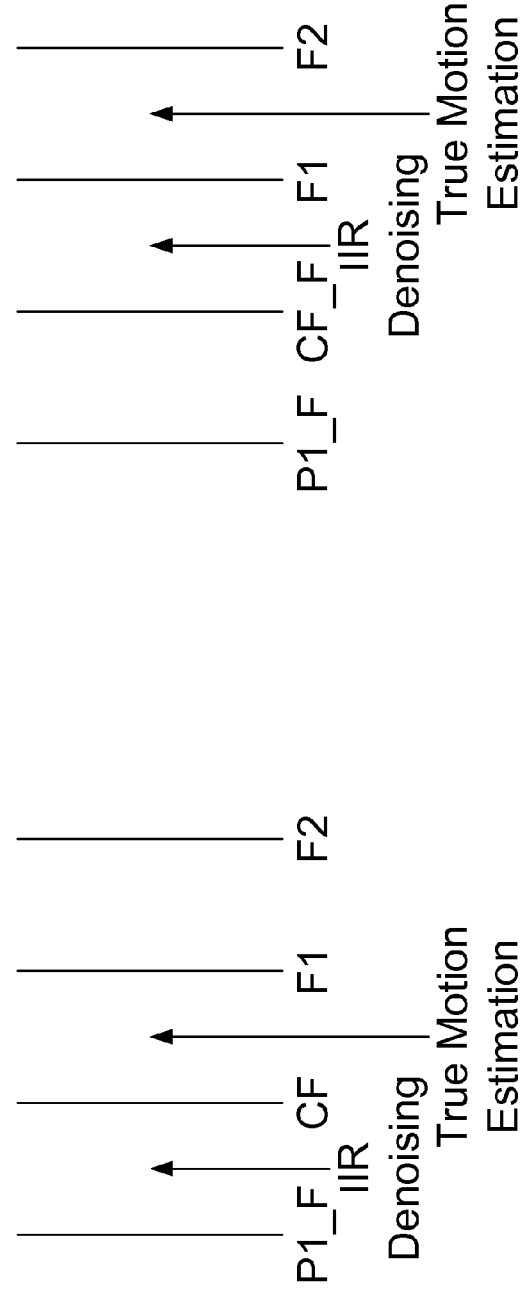

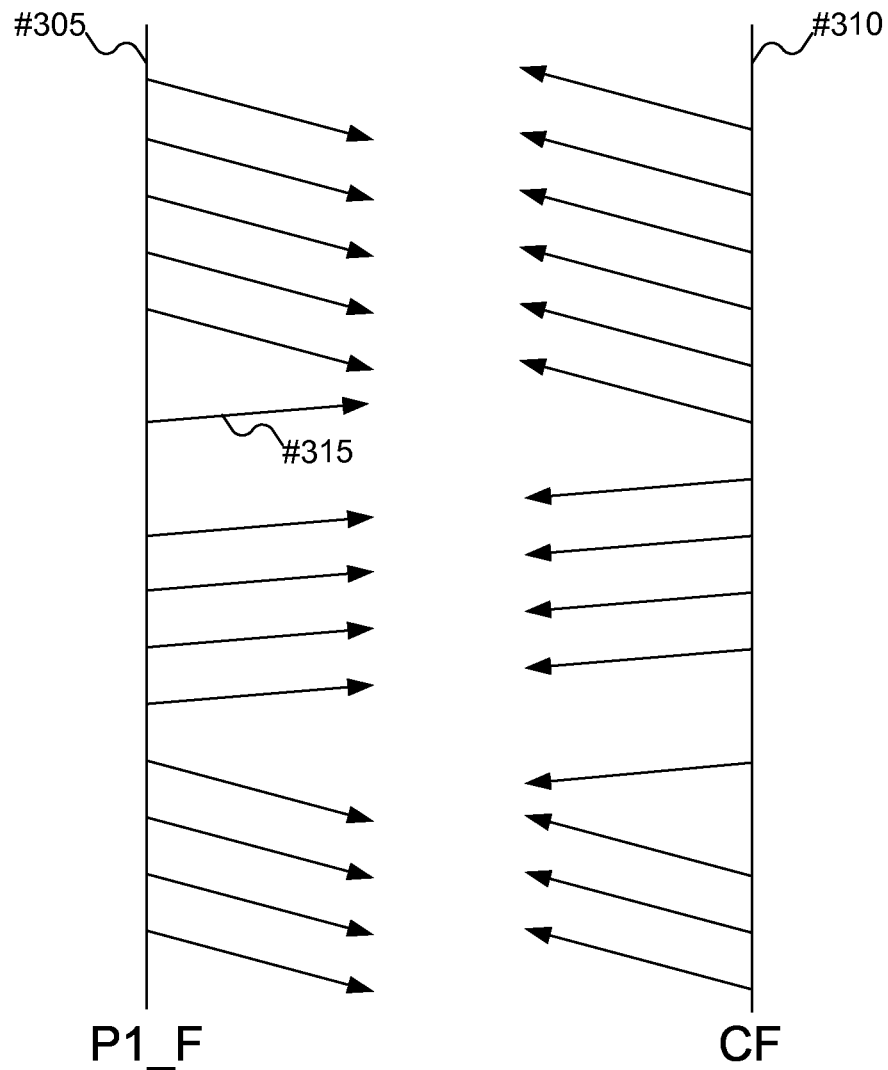
FIG. #3

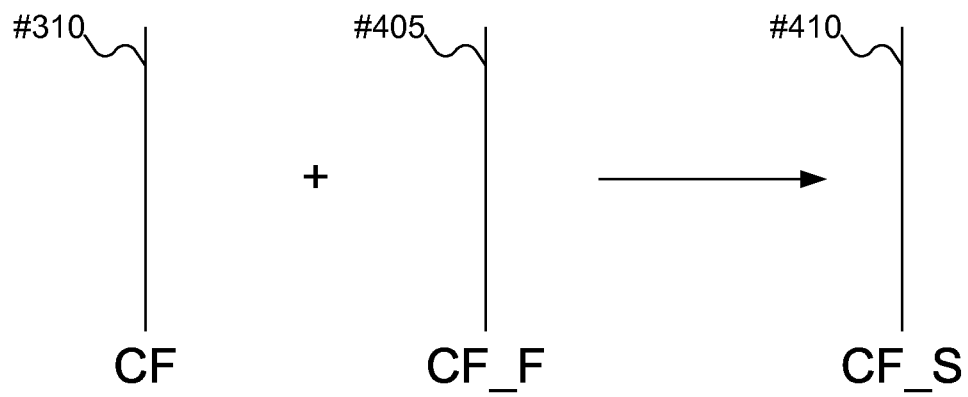
FIG. #4
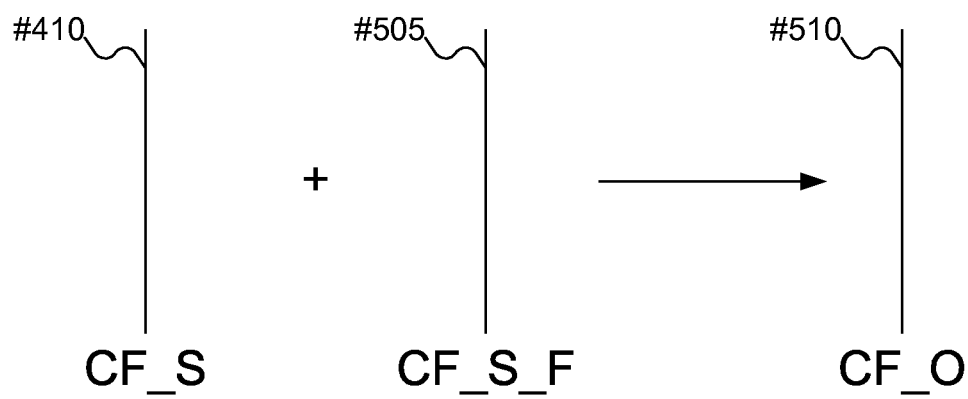
FIG. #5

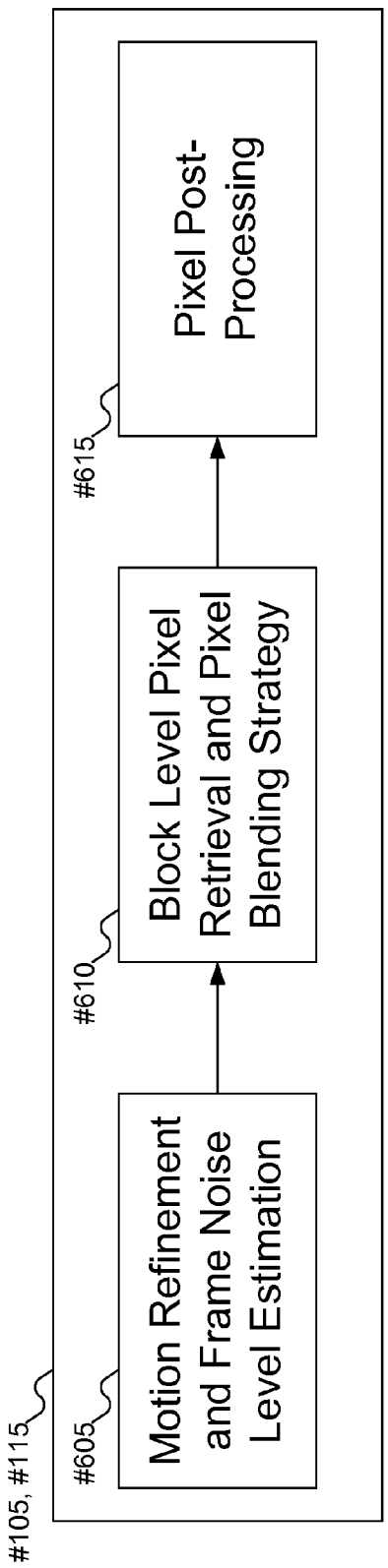
FIG. #6
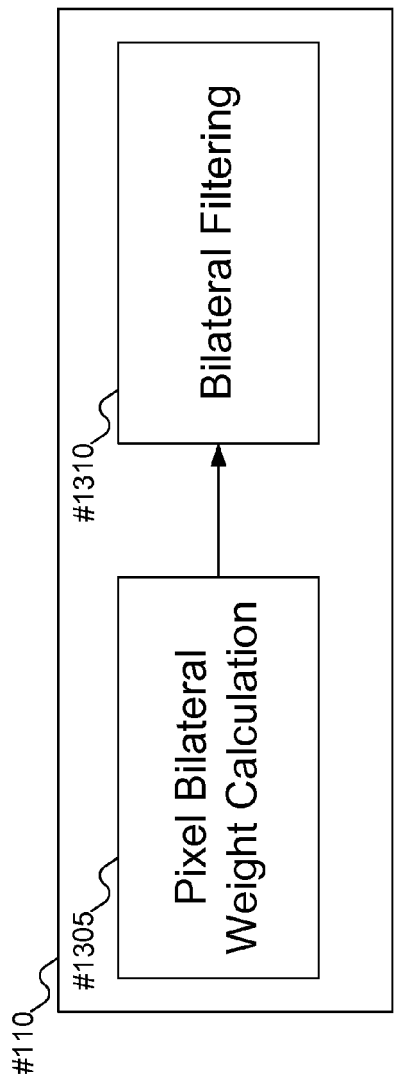
FIG. #13

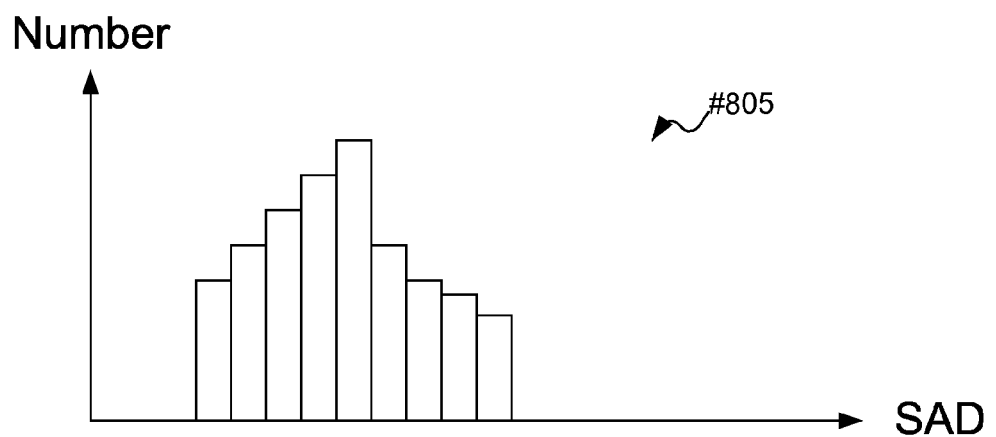
FIG. #7
FIG. #8

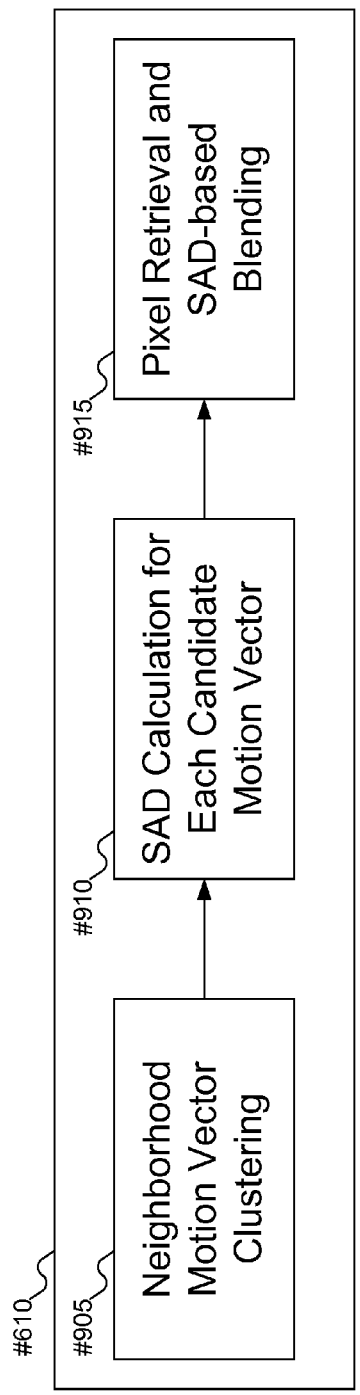
FIG. #9
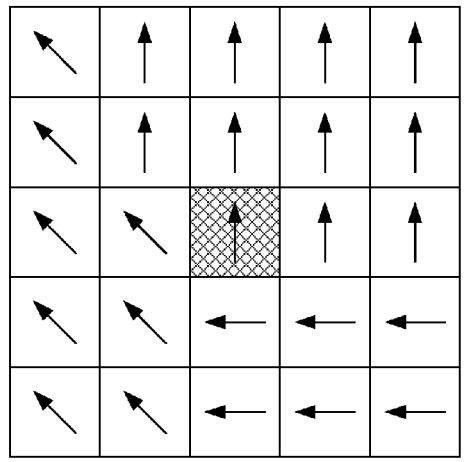
FIG. #10

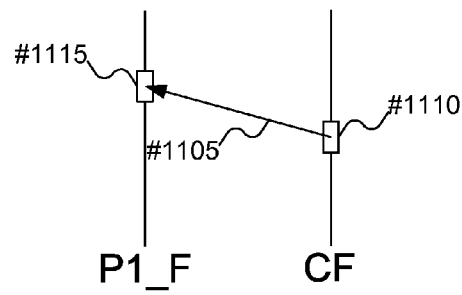
FIG. #11
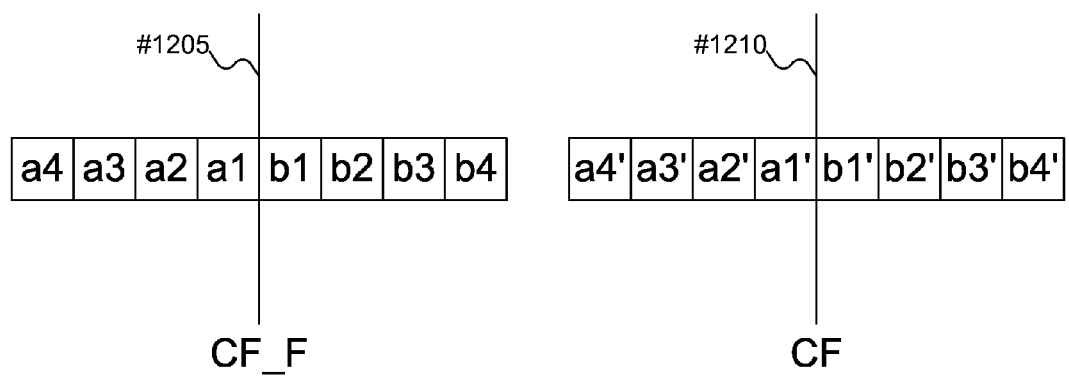
FIG. #12

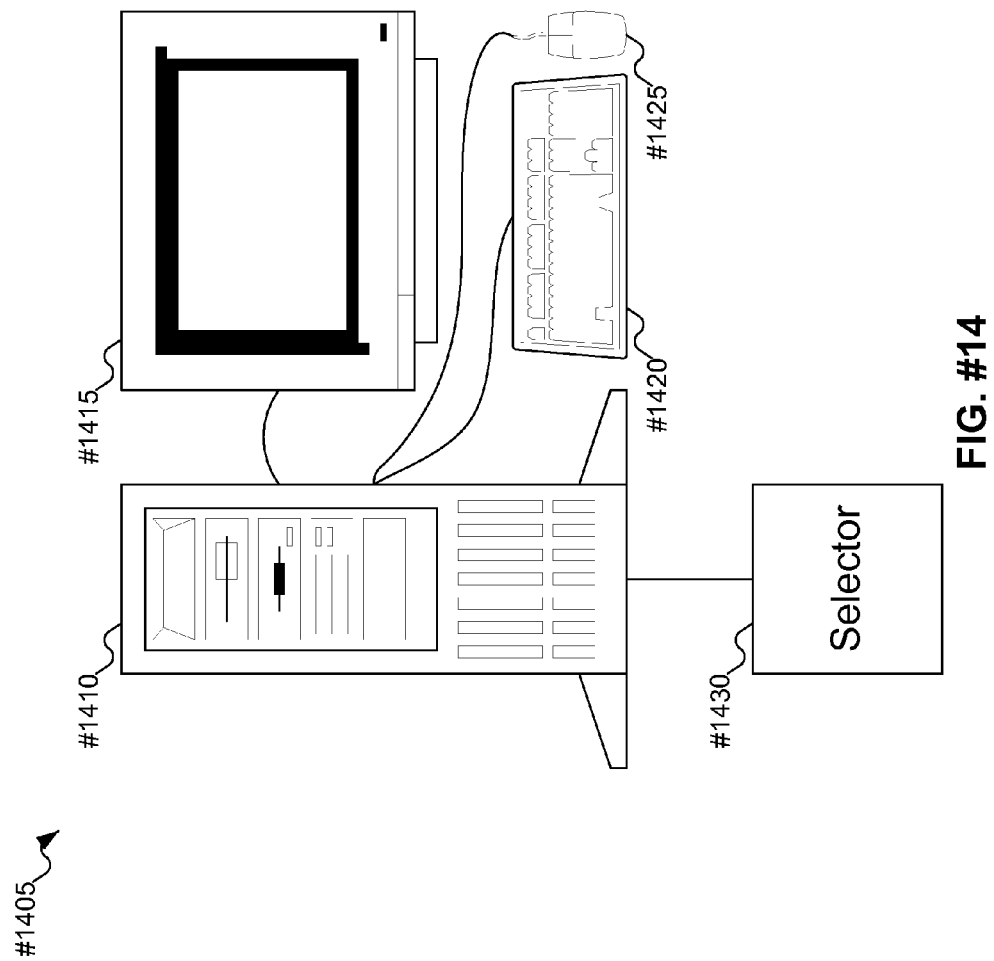

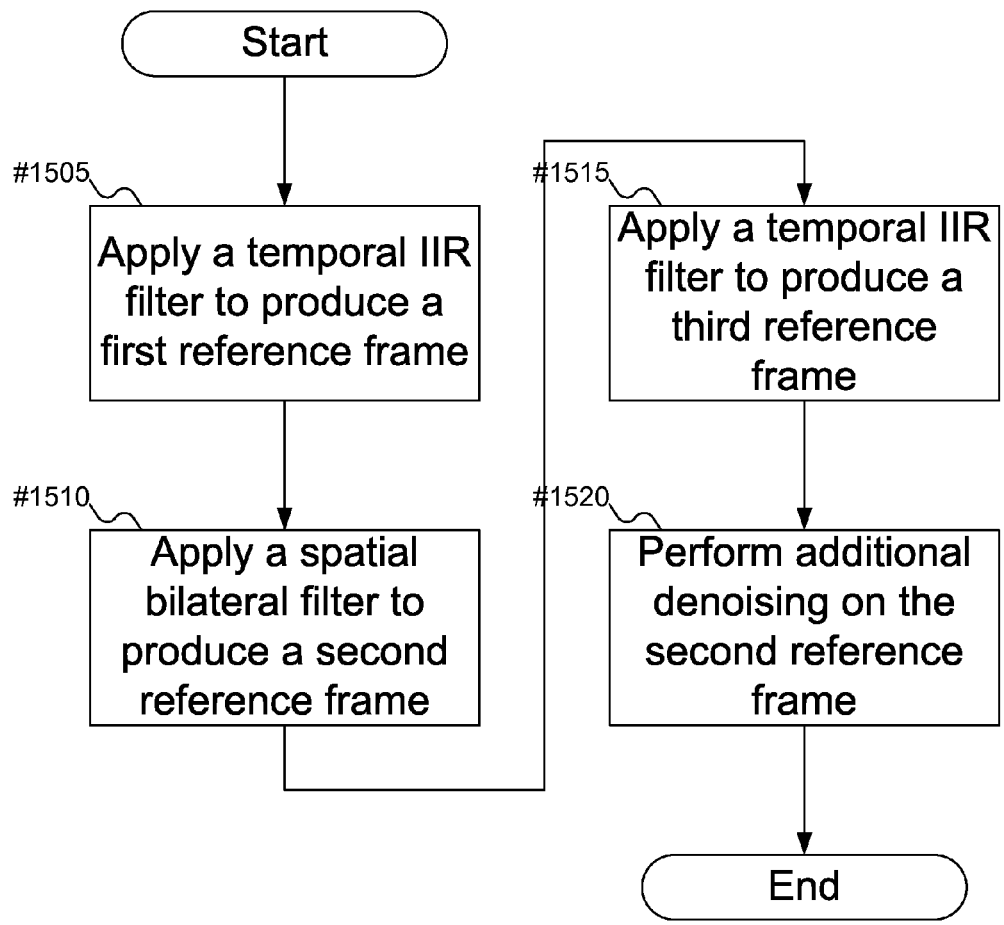
FIG. #15

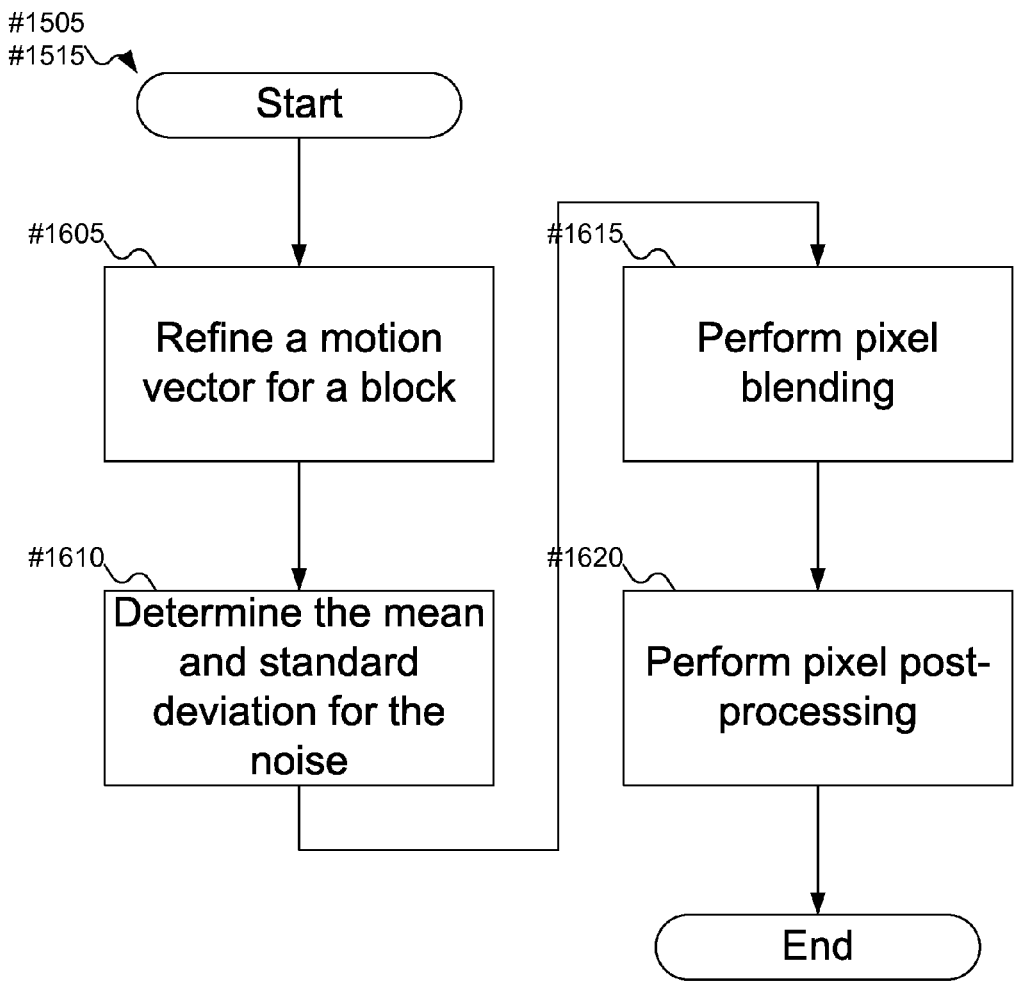
FIG. #16

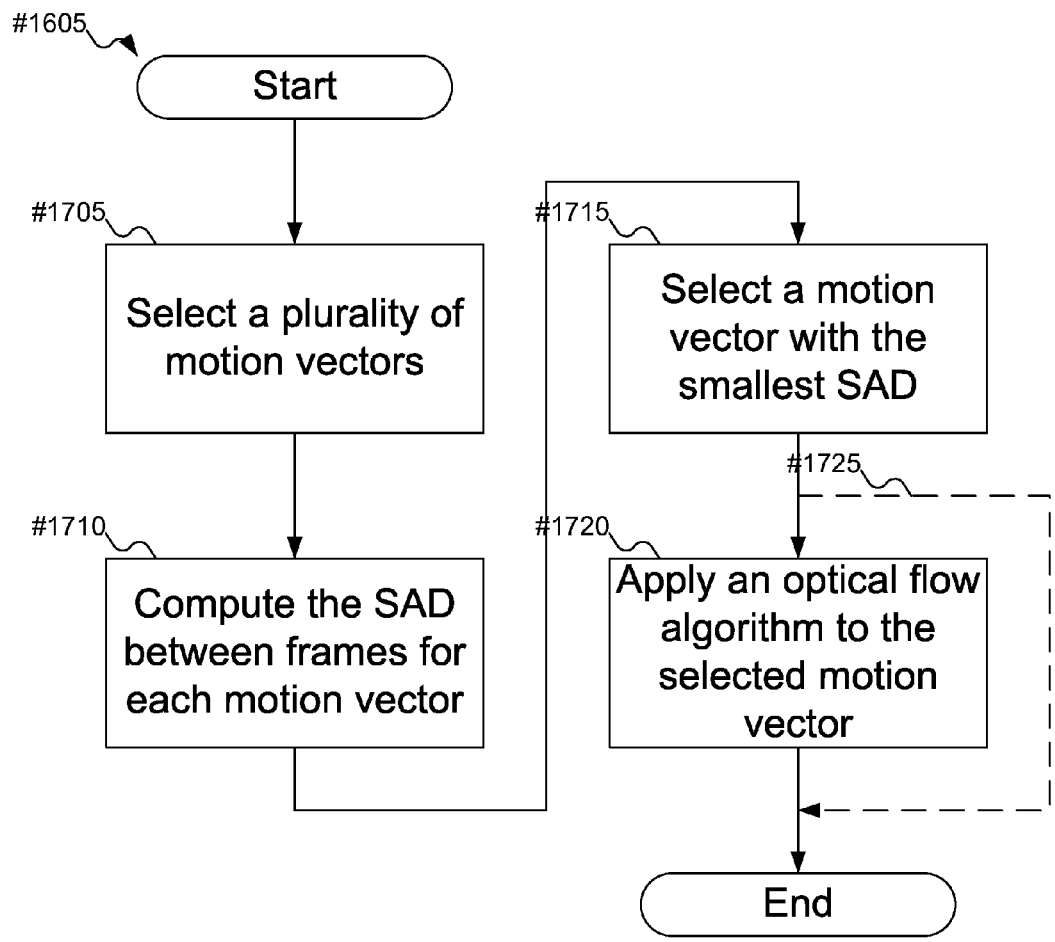
FIG. #17

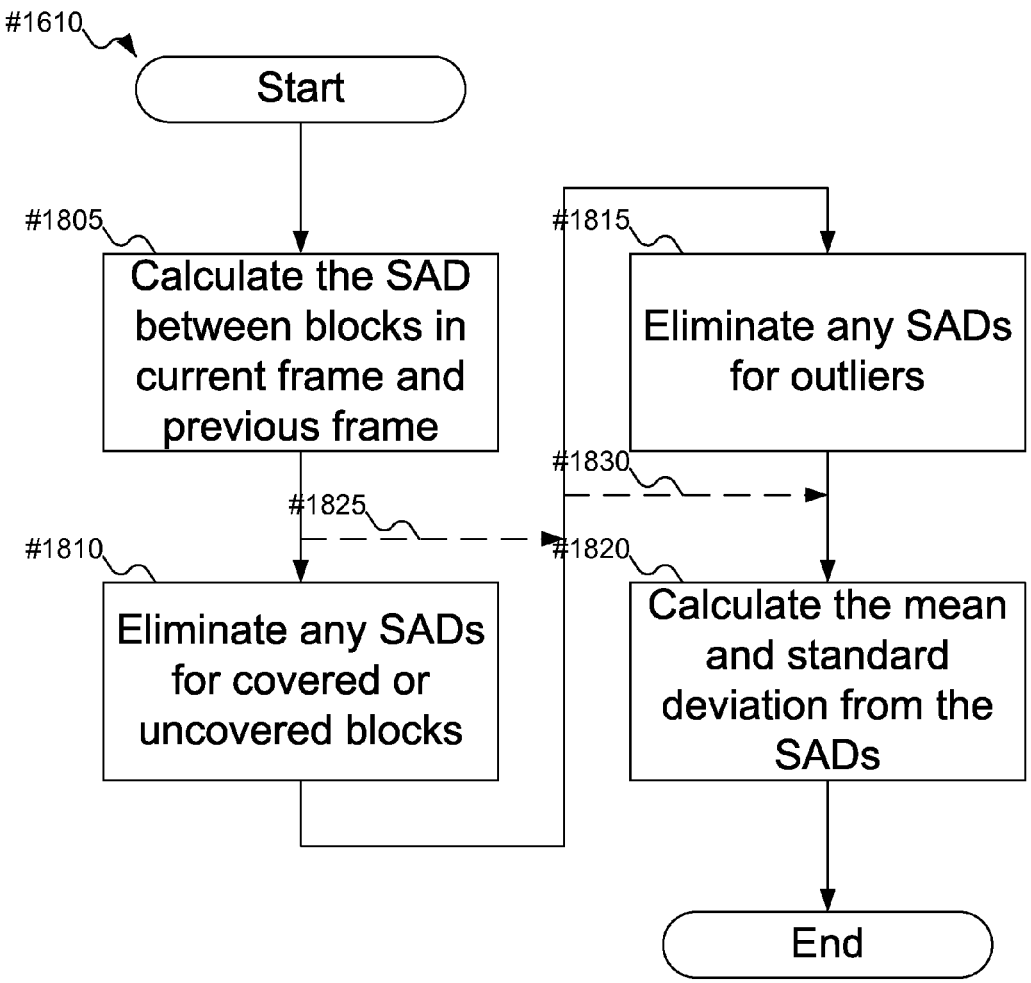
FIG. #18

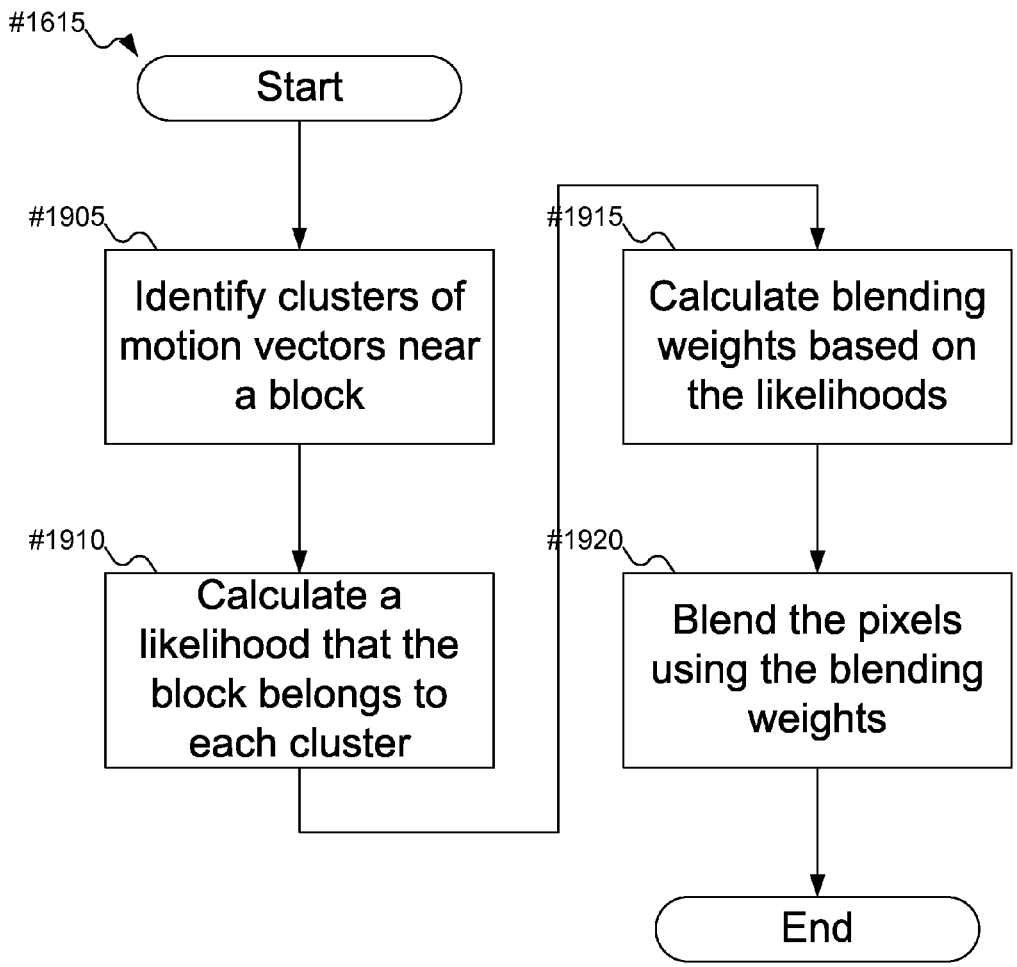
FIG. #19

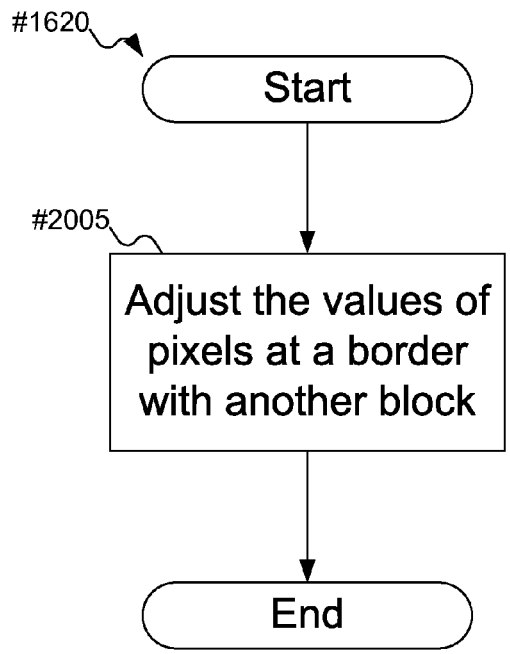
FIG. #20
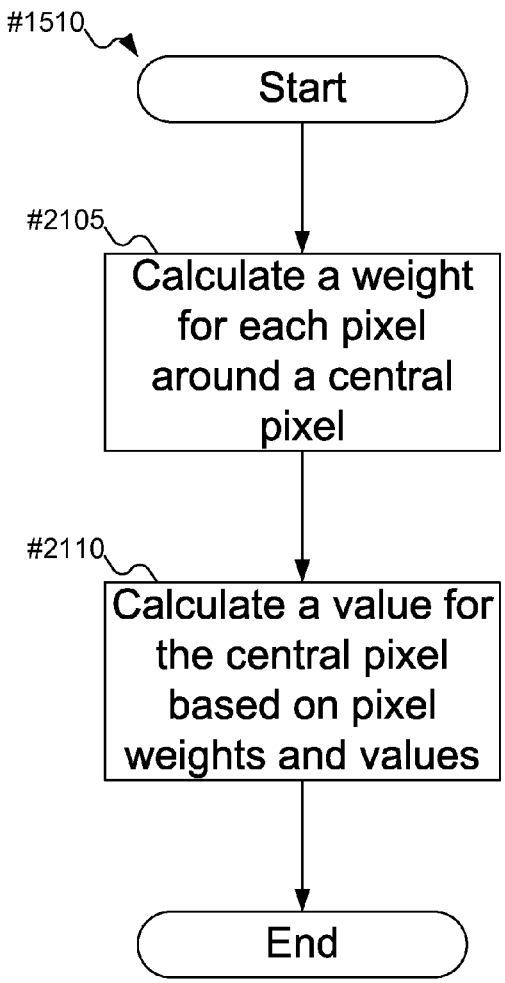
FIG. #21

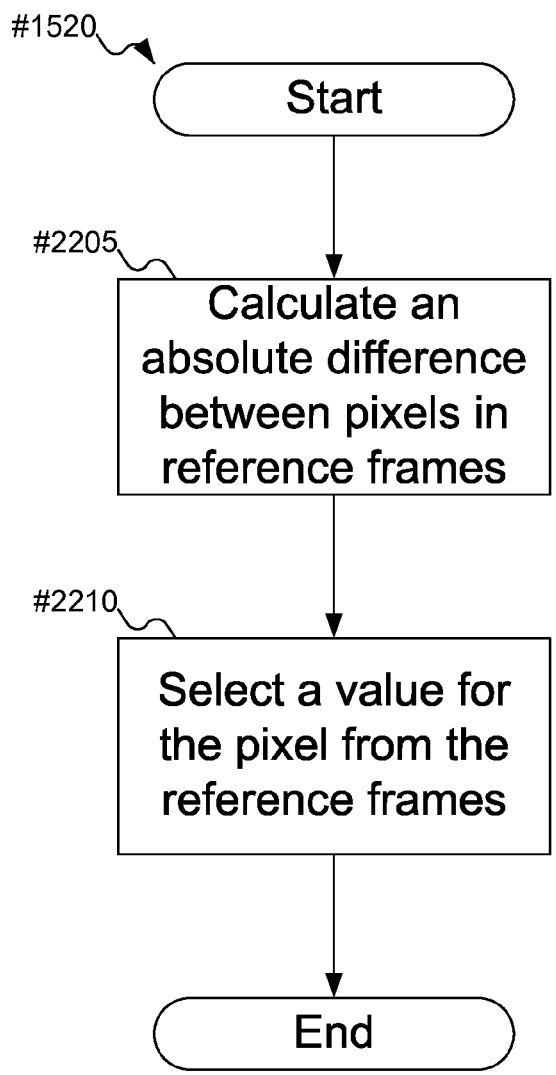
FIG. #22

TRUE MOTION BASED TEMPORAL-SPATIAL IIR FILTER FOR VIDEO

RELATED APPLICATION DATA

This application is related to U.S. patent application Ser. No. 12/966,847, filed Dec. 13, 2010, titled "FUSION OF PHASE PLANE CORRELATION AND 3D RECURSIVE MOTION VECTORS", now pending, U.S. patent application Ser. No. 13/327,634, filed Dec. 15, 2011, titled "USING DOUBLE CONFIRMATION OF MOTION VECTORS TO DETERMINE OCCLUDED REGIONS IN IMAGES", now pending, U.S. patent application Ser. No. 13/327,645, filed Dec. 15, 2011, titled "FRAME INTERPOLATION AND MOTION VECTOR RECONSTRUCTION", now pending, and U.S. patent application Ser. No. 13/918,457, filed Jun. 14, 2013, titled "MOTION ESTIMATION BASED ON BLOCK LEVEL BILATERAL FILTER AND LOCAL MOTION MODEL", now pending, all commonly assigned, all of which are hereby incorporated by reference.

FIELD

This invention pertains to displaying video, and more particularly to removing noise from video data.

BACKGROUND

Video denoising technology is very important in video quality improvement. For example, in low light conditions, video capture can introduce noise. Denoising uses temporal and spatial frame information to reduce noise in video frames. Temporal frame information relates to data between frames, and spatial frame information relates to information within a frame.

Existing denoising techniques typically rely on either temporal or spatial filtering. In temporal filtering, adjacent frames are compared to determine the noise (incorrect data) in the frame. While useful, temporal filtering can introduce ghost and floating artifacts, which can be annoying to the viewer. Spatial filtering avoids the ghost and floating artifacts of temporal filtering, but changes the characteristic of the noise to more of a salt and pepper type and can blur low level details.

Another form of denoising is a non-local mean based denoising algorithm. But this form of denoising is computationally very intensive, and therefore not as useful in situations where the computational ability is limited.

A need remains for a way to improve denoising of video data, that addresses these and other problems associated with the prior art.

BRIEF DESCRIPTION OF THE DRAWINGS

FIG. 1 shows modules arranged in a sequence to perform filtering according to an embodiment of the invention.

FIGS. 2A-2B show embodiments of the invention operating on frames in video data.

FIG. 3 shows example motion vectors for adjacent frames in video data.

FIGS. 4-5 show a frame undergoing temporal and spatial filtering according to embodiments of the invention to produce an output frame.

FIG. 6 shows details of the temporal Infinite Impulse Response (IIR) filters of FIG. 1.

FIG. 7 shows blocks in a neighborhood around a central block to select a motion vector for refinement for the central block.

FIG. 8 shows an example of a histogram for use in determining statistical variables about the noise in a frame of video data.

FIG. 9 shows details of the block level pixel retrieval and pixel blending strategy of FIG. 6.

FIG. 10 shows clusters of motion vectors for blocks in a neighborhood around a central block.

FIG. 11 shows a motion vector in the current frame pointing to a block in the previous frame.

FIG. 12 shows a border between two blocks for pixel post-processing.

FIG. 13 shows details of the temporal-based spatial bilateral filter of FIG. 1.

FIG. 14 shows a system capable of implementing embodiments of the invention.

FIG. 15 shows a flowchart of a procedure for using a temporal-spatial IIR filter to perform denoising.

FIG. 16 shows a flowchart of a procedure for performing temporal IIR filtering in the procedure of FIG. 15.

FIG. 17 shows a flowchart of a procedure for performing motion vector refinement in the procedure of FIG. 16.

FIG. 18 shows a flowchart of a procedure for calculating statistical variables about the noise in a frame of video data in the procedure of FIG. 16.

FIG. 19 shows a flowchart of a procedure for performing pixel blending in the procedure of FIG. 16.

FIG. 20 shows a flowchart of a procedure for performing pixel post-processing in the procedure of FIG. 16.

FIG. 21 shows a flowchart of a procedure for performing spatial filtering in the procedure of FIG. 15.

FIG. 22 shows a flowchart of a procedure for performing additional denoising in the procedure of FIG. 15.

DETAILED DESCRIPTION

FIG. 1 shows modules arranged in a sequence to perform filtering according to an embodiment of the invention. In FIG. 1, module #105 is a temporal Infinite Impulse Response (IIR) filter that can perform temporal filtering on video data. Module #110 is a temporal-based spatial bilateral filter that can perform spatial filtering on the video data, guided by the temporal filtering performed in module #105. Module #110 can be more simply referred to as a spatial bilateral filter, but a person of ordinary skill in the art will understand the type of filter intended. Module #115 is another temporal IIR filter. Used together according to embodiments of the invention, performing both temporal and spatial filtering can provide better denoising than performing just temporal or just spatial filtering, and at a lower computational cost than using a non-local mean based denoising algorithm.

Temporal IIR filter #105 receives video data. Temporal IIR filter #105 then performs temporal filtering on the video data. The results of this temporal filtering are then provided to spatial bilateral filter #110 to perform spatial filtering. But spatial bilateral filter #110 does not perform filtering on the results of temporal IIR filter #105. Instead, spatial bilateral filter #110 uses the results of temporal IIR filter #105 to guide the spatial filtering on the original video frame.

In a similar manner, temporal IIR filter #115 does not directly perform temporal filtering on the results of spatial bilateral filter #110, but uses the information from its temporal filtering in combination with the results of spatial bilateral filter #110 to produce the final output video data.

Although temporal IIR filters #105 and #115 are identified with different figure reference numbers, a person of ordinary skill in the art will recognize that these modules operate in the same manner. Therefore, any description below to either of temporal IIR filters #105 and #115 is intended to refer to both of these filters.

By combining temporal IIR filters #105 and #115 with spatial bilateral filter #110, the spatial filtering can be done without introducing the ghosts and floating artifacts that can occur with temporal filtering. By temporally filtering the results of spatial bilateral filter #110, low frequency noise that cannot be eliminated by the spatial bilateral filter #110 can be reduced.

An IIR filter can be contrasted with a Finite Impulse Response (FIR) filter. The difference between the two types of filters is that in an BR filter information from a sample is kept forever (although its importance can diminish over time). An IIR filter can be analogized to a recursive algorithm that has no way to break out of the recursion: information from every previous pass is still available. In contrast, a FIR filter keeps information from a sample around for a finite amount of time, after which the information disappears. The advantage of an IIR filter is that an IIR filter can produce a lower cut-off frequency than a FIR for the same amount of computation. The disadvantage of an IIR filter is that if there is a sudden change in the data, it can be difficult to remove the impact of the data before the change.

FIGS. 2A-2B show embodiments of the invention operating on frames in video data. In FIGS. 2A and 2B, a portion of the video data, consisting of four video frames, is shown undergoing temporal-spatial filtering. The video frames are labeled as P1_F, CF (in FIG. 2A), CF_F (in FIG. 2B), F1, and F2. CF refers to the current (noisy) frame being processed. P1 refers to the frame immediately preceding the current frame: if additional frames were shown, they could be labeled P2, P3, and so on. Similarly, F1 and F2 refer to the next two frames following the current frame.

The suffix "_F" indicates that a frame has been temporally filtered by temporal IIR filter #105 according to embodiments of the invention. As will be seen below with reference to FIGS. 4 and 5, other suffixes include "_S", indicating that a frame has been spatially filtered by spatial bilateral filter #110, "_S_F", indicating that a frame has been both spatially filtered by spatial bilateral filter #110 and temporally filtered by temporal IIR filter #115, and "_O", indicating an output frame that has been denoised.

In FIG. 2A, video frames #205 shows the state of the frames at one point in time. Note that the current frame has not yet been filtered. In FIG. 2A, the current frame is undergoing true motion estimation, while the previous frame is undergoing denoising (true motion estimation being essentially one step in the overall denoising process). Frame P1 has begun the denoising process but has not yet completed the process in FIG. 2A.

In FIG. 2B, video frames #210 show the same frames at a later point in time. At this point, true motion estimation of the current frame is complete, and IIR denoising of the current frame has begun. In the meantime, true motion estimation of the next frame F1 has begun.

A person of ordinary skill in the art will recognize that the operations of the modules shown in FIG. 1, and represented over time in FIGS. 2A and 2B, are effectively a pipeline, similar to pipeline architectures used in processor design. That is, data is fed into one section of the pipeline, after which that data (as processed) is passed to the next section of the pipeline and the first section of the pipeline can process new data. This sequence repeats for each section of the pipeline: when a piece of data has completely traversed the pipeline, it is then output from the other end.

FIG. 3 shows example motion vectors for adjacent frames in video data. For blocks in each frame, there are often corresponding blocks in adjacent frames that represent the same portion of the image, but perhaps moved (either because the camera is moving, the object that includes the block is moving, or both). For each block, a motion vector can be constructed that represents the motion of the block. A motion vector, as is normal with vectors, can indicate both direction and magnitude, to indicate as precisely as possible where the corresponding block is located. Any desired technique can be used to calculate the motion vectors for the frames.

For example, previous frame #305 and current frame #310 have various blocks in it. (FIG. 3 shows previous frame #305 and current frame #310 with lines when they would normally be two-dimensional, but FIG. 3 represents a simplification of the representation: a person of ordinary skill in the art would recognize how FIG. 3 can be generalized to greater dimensions.) For each block, a motion vector points toward the corresponding block in the other frame. Thus, the motion vectors from previous frame #305 point toward current frame #310, and the motion vectors from current frame #310 point toward previous frame #305.

Of course, FIG. 3 represents only represents the motion vectors associated with one pair of frames. For each pair of frames, there can be motion vectors between the frames. Thus, for example, there can be motion vectors between previous frame #305 and the frame before it, and there can be motion vectors between current frame #310 and the frame after it.

A person skilled in the art will recognize that, while the motion vectors shown in FIG. 3 could represent with 100% accuracy (or as close to it as is reasonable) the corresponding blocks between frames, it is more likely that the motion vectors represent approximations of where the corresponding blocks are located in the other frame. For example, a block in one frame might represent an object that is in the background of that frame, and is covered by a foreground object in the next frame. A motion vector for such a block would not accurately identify a corresponding block in the next frame, because no corresponding block actually exists in the next frame. This situation is shown by motion vector #315: this vector points from a block in previous frame #305 toward a block in current frame #310, but the corresponding block in current frame #310 does not point back to the block in previous frame #305. A similar issue can arise where a block is uncovered in a frame: the block would have no corresponding block in the previous frame.

FIGS. 4-5 show a frame undergoing temporal and spatial filtering according to embodiments of the invention to produce an output frame. In FIG. 4, current frame #310 can undergo temporal IIR filtering using temporal IIR filter #105 (from FIG. 1) to produce temporally filtered frame #405. Then spatial bilateral filter #110 (again, from FIG. 1) can be used to generate spatially filtered frame #410. Note that the "equation" shown in FIG. 4 is not intended to be a mathematical equation, but rather a representation of the concept that information from current frame #310 and temporally filtered frame #405 are used in generating spatially filtered frame #15.

Similarly, in FIG. 5, spatially filtered frame #410 can undergo temporal filtering using temporal IIR filter #115 (again, from FIG. 1) to produce temporally and spatially filtered frame #505. Then, spatial filtered frame #410 and temporally and spatially filtered frame #505 can be used to generate output frame #510.

FIG. 6 shows details of the temporal Infinite Impulse Response (IIR) filters of FIG. 1. In FIG. 6, the temporal IIR filters include motion refinement and frame noise level estimation module #605, block level pixel retrieval and pixel blending strategy module #610, and pixel post-processing module #615.

Motion refinement and frame noise level estimation module #605 can implement true motion calculation techniques already described in U.S. patent application Ser. No. 12/966,847, filed Dec. 13, 2010, titled "FUSION OF PHASE PLANE CORRELATION AND 3D RECURSIVE MOTION VECTORS", now pending, U.S. patent application Ser. No. 13/327,634, filed Dec. 15, 2011, titled "USING DOUBLE CONFIRMATION OF MOTION VECTORS TO DETERMINE OCCLUDED REGIONS IN IMAGES", now pending, U.S. patent application Ser. No. 13/327,645, filed Dec. 15, 2011, titled "FRAME INTERPOLATION AND MOTION VECTOR RECONSTRUCTION", now pending, and U.S. patent application Ser. No. 13/918,457, filed Jun. 14, 2013, titled "MOTION ESTIMATION BASED ON BLOCK LEVEL BILATERAL FILTER AND LOCAL MOTION MODEL", now pending, all commonly assigned, all of which are hereby incorporated by reference. True motion calculation can be first carried out on input noisy image pairs (that is, consecutive frames of noisy video data). For example, for two noisy frames P1 and CF, two fields of motion can be calculated by the true motion estimation module: these fields of motion can be labeled P1Phase0MV and CFPhase1MV. These labels identify the video frame from which the motion fields originate (P1 or CF) and the direction of the motion field (Phase0 indicating that the motion field points forward in time and Phase1 indicating that the motion field points backward in time—fractional values for the phase are also possible). Examples of these fields of motion (also called motion vectors) are shown in FIG. 3 above.

It is worth noting that motion vectors are not typically calculated for pixels, but rather for blocks. Blocks of pixels in any shape can be used, by typically blocks are 4×4, 8×8, 16×16, and so on.

The true motion estimation process can be performed one frame prior to the IIR denoising process as illustrated in FIGS. 2A-2B.

Because denoising occurs after the true motion field is estimated (as shown in FIGS. 2A-2B, the CFPhase1MV motion field is calculated based on the noisy data in P1 and CF. By the time denoising is done on the current frame, a motion field for P1_F can be calculated, but the CFPhase1MV motion field is still noisy and potentially inaccurate. Thus, before performing denoising, the true motion field can be refined by recalculating the motion field between P1_F and CF.

After calculating a new motion vector field between P1_F and CF (labeled CFPhase1MV_F), candidates can be selected from both the original motion vector field (CFPhase1MV) and the new motion vector field (CFPhase1MV_F). Any number of candidates can be selected: for example, two candidates can be selected from each motion vector field.

FIG. 7 shows an example of how candidates can be selected. In FIG. 7, block #705 is the central block whose motion vector is being refined. Blocks #710, #715, and #720 all represent blocks with refined motions. The two most different motion vectors from these three blocks can be chosen. It is likely that one of these motion vectors is for background data and one is for foreground data, and it is desirable to have the foreground motion vector. In addition, two candidates (one of them the original motion vector for block #705) can be selected from blocks #725, #730, #735, #740, and #745, which contact central block #705. The selected candidates can be chosen in any desired manner. The block directly underneath the central block, for example, frequently can be selected as the closest block when using a distance measurement (between the center of the blocks).

Returning to FIG. 6, once the candidates are selected, motion refinement and frame noise level estimation module #605 calculates the Sum of Absolute Differences (SAD) between current block in the current frame CF and the blocks in the temporally filtered previous frame P1_F identified by the candidate motion vectors. Penalty logic can be used to add a spatial smoothness constraint, as described in the related applications listed above, which can favor the use of motion vectors from P1_F over P1. An optical flow algorithm, such as the Lucas Kanade Optical Flow Algorithm, can then be used to refine the motion vector to produce a final refined motion vector for the central block. Refining the motion vector can factor in the gradient of the pixels and the delta between them. This final refined motion vector can then be stored.

The use of SAD is not required: other metrics can be used. Another metric that can be used is the Sum of Square Differences (SSD). SAD is not as sensitive to outliers in the noise: SSD is better for noisy environments. But SSD is significantly more expensive to implement, and SAD provides an adequate metric given the circumstances. A person skilled in the art will also recognize other metrics that can be used.

After the CFPhase1MV_F motion field has been refined, the system can perform cover/uncover detection. As mentioned above, blocks in one frame might not have corresponding blocks in the other frame, because of the relative motion of the camera, objects in the foreground, and objects in the background. The related applications listed above include a description of how mvdiff can be used to identify cover/uncover situations: if the mvdiff for a block is below a threshold, then the block is not considered to be covered/uncovered, and its SAD value is added to a histogram.

An example of such a histogram is shown in FIG. 8 as histogram #805. Histogram #805 gives information about the frame noise level. Histogram #805 is assumed to have a Gaussian distribution in random Gaussian noise cases. The mean and standard deviation of the frame noise can then be calculated according to Equations (1) and (2):

$$\text{Noise}_\mu = \frac{\sum SAD(n) * Num(n)}{\sum Num(n)} \quad \text{Equation (1)}$$

$$\text{Noise}_\sigma = \sqrt{\frac{\sum (|SAD(n) - \text{Nosie}_\mu|^2 * Num(n))}{\sum Num(n)}} \quad \text{Equation (2)}$$

where SAD(n) is the sum of the SAD values in bin number n and Num(n) is the number of SAD values in bin number n.

The case where there is no motion is of little interest in and of itself, but it demonstrates that as long as the true motion vectors are accurate, the distribution of histogram #805 is Gaussian. And while the above description does not eliminate all outliers from histogram #805, a person skilled in the art will recognize that additional outliers can be eliminated based on fractional motion values or other methods: for example, to use statistical information to eliminate SAD values that are large and therefore probably caused by motion vector errors.

Continuing the assumption that histogram #805 has Gaussian distribution, it is possible to estimate the distribution of SAD values caused by noise using only the left-hand side of the distribution. Knowing the mean (Noise$_\mu$) and the standard deviation (Noise$_\sigma$) of the noise and assuming that the noise has a Gaussian distribution, the distribution of noise on the left-hand side of the bell curve is a fairly good estimation of the overall distribution. For example, assume two points on the histogram are chosen, such as 15.9% and 2.3%. These points represent minus 1 sigma (m1s) and minus 2 sigma (m2s), respectively. From these values, it is possible to calculate values for the average noise (calculated 2*m2s−m1s) and plus 1 sigma (p1s) (calculated as 3*m2s−2*m1s). Then, anything outside minus 1 sigma and plus 1 sigma can be treated as an outlier, which can be eliminated to avoid their having too much influence.

Returning to FIG. 6, block level pixel retrieval and pixel blending strategy module #610 uses the refined motion field CFPhase1MV_F and the noise statistics Noise$_\mu$ and Noise$_\sigma$ to do pixel retrieval and pixel blending. As shown in FIG. 9, block level pixel retrieval and pixel blending strategy module #610 includes three sub-modules: neighborhood motion vector clustering module #905, SAD calculation module #910, and pixel retrieval and SAD-based blending module #915.

Neighborhood motion vector clustering module #905 collects neighbors of the current block. In one embodiment of the invention, a set of N*N total blocks (including the current block) are collected. FIG. 10 shows an example neighborhood #1005, where N is 5. In other embodiments of the invention, the neighborhood can be rectangular rather than square, encompassing N*M blocks. The motion vectors of the blocks in the neighborhood can then be clustered based on distance between the motion vectors. For two motion vectors MV1 and MV2, each with x and y components, the distance between the motion vectors can be computed using Equation (3):

$$\text{Dist}=|MV1\cdot x-MV2\cdot x|+|MV1\cdot y-MV2\cdot y| \qquad \text{Equation (3)}$$

A threshold can be used to decide whether two motion vectors belong to the same cluster or not. For example, a threshold value THR_MV of 16 can be used. This threshold value can eliminate variation in motion vectors due to noise in the motion vector calculation. For each cluster of motion vectors, an average motion vector can be calculated. At this point, the following pieces of data are known about each cluster:

The number of the cluster (the clusters can be numbered in any desired manner, including arbitrary numbering) is labeled n
 The number of motion vectors in cluster n is labeled Num_MV(n)
 The average motion vector in cluster n is labeled MV(n)

For example, in FIG. 10, there are three clusters of motion vectors. One cluster (including the top-left block) includes 8 blocks, another cluster (including the bottom-left block) includes 6 blocks, and the third cluster (including the bottom-right block) includes 10 blocks. Note that the current block is not considered to be part of any specific cluster yet, since it could belong properly to any of the clusters (notwithstanding the motion vector of the current block).

SAD calculation module #910 takes the average motion vectors for each cluster and uses those motion vectors to identify blocks in the temporally filtered previous frame P1_F. FIG. 11 shows an example of one of the average motion vectors #1105 pointing from current block #1110 in the current frame CF to block #1115 in the temporally filtered previous frame P1_F. Then, for each such identified block, SAD calculation module #910 calculates the SAD between the current block in the current frame CF and the identified block in the temporally filtered previous frame P1_F. The SAD for each such average motion vector can be labeled as SAD(n), where n again represents the number of the cluster.

Note that while the above discussion implies that the SAD is calculated using the average motion vector for each cluster in the neighborhood, a person skilled in the art will recognize that not every average motion vector needs to be used. In some embodiments, only a subset of the average motion vectors are selected for use. The process by which the subset of the average motion vectors are selected can use any desired algorithm. The larger a cluster is, the more reliable its average motion vector is likely to be.

Pixel retrieval and SAD-based blending module #915 can then blend the pixels in the block using the SAD(n) and Num_MV(n) values described above along with Noise$_\mu$ and Noise$_\sigma$. Pixel blending starts by calculating the value shown in Equation (4):

$$N(n) = \frac{\max(0, SAD(n) - \text{Noise}_\mu)}{\text{Noise}_\sigma} \qquad \text{Equation (4)}$$

This value N(n) can be used to evaluate the quality of the candidate motion vector MV(n). A large value for N(n) means that SAD(n) is far from the center of frame noise level and the quality of motion is low. Note that SAD(n) is expected to have a positive value because of the noise, so the average noise is subtracted from SAD(n).

Next, N(n) can be used to determine a blending weight W(n). In some embodiments of the invention, W(n)=e$^{-N(n)}$. But this equation is non-trivial to calculate, so in other embodiments of the invention W(n) is calculated using a look-up table. Still other embodiments of the invention can compute W(n) using piecewise linear functions. Larger values of N(n) can then map to smaller values of W(n). A blending weight W_CF for the current block can also be defined by looking up the value 0 in the look-up table.

Finally, the pixels for the current block can be blended using Equation (5):

$$\text{Blk\_F} = \frac{\sum_n (R*Blk(n)*W(n) + \text{Blk\_CF}*\text{W\_CF})*\text{Num\_MV}(n)}{\sum_n (R*W(n) + \text{W\_CF})*\text{Num\_MV}(n)} \qquad \text{Equation (5)}$$

Where R is a parameter to control the weight of the IIR filter and Blk(n) is the group of pixels in the temporally filtered previous frame P1_F by motion vector MV(n). A larger value for R means that the weight of the previous frame is larger when blended with current frame. Note that the result of Equation (5) returns a matrix of pixels (i.e., a block), and not a single value for a single pixel.

As discussed above, in some embodiments of the invention average motion vectors are computed for only a subset of the clusters: in such embodiments, only those clusters are factored into the pixel blending. After the calculation, Blk_F is the result of pixel blending and can be output from module #610.

Returning to FIG. 6, the pixel blending performed by block level pixel retrieval and pixel blending strategy module #610 can introduce block artifacts near block boundaries. Pixel post-processing module #615 can be used to eliminate the block artifacts.

FIG. 12 shows vertical boundary #1205 between two blocks in filtered frame CF_F, and vertical boundary #1210 between two blocks in unfiltered frame CF. One block in filtered frame CF_F includes pixels a1, a2, a3, and a4, and the other block includes pixels b1, b2, b3, and b4. Similarly, one block in unfiltered frame CF includes pixels a1', a2', a3', and a4', and the other block includes pixels b1', b2', b3', and b4'. In some embodiments of the invention, a total of eight pixels are used in post-processing, but a person skilled in the art will recognize that, with suitable adjustment, any number of pixels can be used. While FIG. 12 shows a vertical boundary, a person skilled in the art will recognize that horizontal boundaries can be post-processed in a similar manner.

The following values can then be calculated:

$$D\_border = abs(a1-b1)$$

$$D\_1 = \max(abs(a1-a2), abs(a2-a3), abs(a3-a4))$$

$$D\_2 = \max(abs(b1-b2), abs(b2-b3), abs(b3-b4))$$

$$D\_3 = abs(a1'-b1')$$

$$D\_4 = \max(abs(a1'-a2'), abs(a2'-a3'), abs(a3'-a4'))$$

$$D\_5 = \max(abs(b1'-b2'), abs(b2'-b3'), abs(b3'-b4'))$$

$$D\_\max = \max(D\_1, D\_2, D\_3, D\_4, D\_5)$$

$$D\_diff = D\_border - D\_\max$$

At this point, a comparison can be made to determine if there are block artifacts by comparing D_border with D_max, multiplied by a threshold THR_K that can control the criteria. In some embodiments of the invention, THR_K is set to a value between 1 and 2. If D_border>D_max*THR_K, then the four pixels nearest the block boundary are adjusted as follows:

If $(a1 \geq b1)$ then Flag=1 else Flag=-1

$$a1 = a1 - Flag*D\_diff/2$$

$$a2 = a2 - Flag*D\_diff/4$$

$$b1 = b1 + Flag*D\_diff/2$$

$$b2 = b2 + Flag*D\_diff/4$$

Turning to FIG. 13, spatial bilateral filter #110 uses the temporally filtered frame as a reference to guide spatial filtering in current frame. Spatial bilateral filter #110 can reduce the noise using spatial information without introducing temporal artifacts like ghost and floating artifacts.

Spatial bilateral filter #110 can take a pixel in the current frame CF and find the corresponding pixel in the temporally filtered current frame CF_F. (In this context, "central pixel" does not refer to a pixel in the center of the frame, but rather to a pixel that is in the center of the neighborhood collected around it. In that sense, every pixel can be a "central pixel".) For reference, the central pixel from frame CF is referred to as pix, and the central pixel from frame CF_F is referred to as pix_ref$_c$.

Next, neighborhoods around the central pixel in both frames CF and CF_F are identified. The neighborhoods around the central pixel can be of any dimension: for example, N*M. For such a neighborhood, the identified pixels can be labeled as Pix(i, j) and Pix_ref(i, j), where i ranges from $-(N-1)/2$ to $(N-1)/2$, j ranges from $-(M-1)/2$ to $(M-1)/2$, and pix(0, 0) is the central pixel (either Pix$_c$ or Pix_ref$_c$). There is no requirement that N and M have different values: if they have the same value, then obviously the neighborhoods around the central pixels are square rather than rectangular. But the dimensions of the neighborhoods around the two central pixels should be the same.

Spatial bilateral filter #110 includes pixel bilateral weight calculation module #1305 and bilateral filtering module #1310. Pixel bilateral weight calculation module #1305 calculates weights to be used in adjusting the value of the central pixel. The differences in values between the central pixel in the temporally filtered frame CF_F and each pixel in its neighborhood are calculated. In addition, the spatial distance between the central pixel and each pixel in the neighborhood are calculated as follows:

$$Pix\_diff(i,j) = abs(Pix\_ref(i,j) - Pix\_ref_c)$$

$$Spa\_diff(i,j) = sqrt(i^2 + j^2)$$

Then, these values are converted to domain and range filtering weight for bilateral filtering via a look-up table as:

$$Weight\_range(i,j) = LUT(Pix\_diff(i,j))$$

$$Weight\_domain(i,j) = LUT(Spa\_diff(i,j))$$

As discussed above with reference to FIG. 9, a look-up table can be used when a direct calculation of the desired function is too complex for the system. Therefore, in some embodiments of the invention, a look-up table is used that approximates the desired functions. But in other embodiments of the invention, the direct formulas can be used, as follows:

$$Weight\_range(i,j) = e^{-K1*Pix\_diff(i,j)}$$

$$Weight\_domain(i,j) = e^{-K2*Spa\_diff(i,j)}$$

where K1 and K2 are constants that can be adjusted to control the amount of lowpass filtering performed.

It is worth noting that the above calculations can be performed each time a pixel needs to be adjusted using spatial bilateral filtering. Thus, any pixel in temporally filtered current frame CF_F can be referenced many times, as it can be included in the neighborhood of any number of pixels.

At this point, bilateral filtering module #1310 can perform bilateral filtering for the central pixel, using Equation (6) below:

$$Pix_c = \frac{\sum_{i=-(N-1)/2}^{(N-1)/2} \sum_{j=-(M-1)/2}^{(M-1)/2} Weight\_range(i,j) * Weight\_domain(i,j) * Pix(i,j)}{\sum_{i=-(N-1)/2}^{(N-1)/2} \sum_{j=-(M-1)/2}^{(M-1)/2} Weight\_range(i,j) * Weight\_domain(i,j)} \quad \text{Equation (6)}$$

Note that the weights are drawn from the temporally filtered reference frame CF_F, but the values of the pixel itself are drawn from the unfiltered frame CF.

Using temporal-based spatial bilateral filter #110, the noise in the original noisy image can be reduced, without introducing temporal artifacts from the temporal IIR filter.

For Gaussian random noise, the spatial filter cannot eliminate low frequency noise completely because the average uses a finite number of pixels. Therefore, the spatially bilaterally filtered pixel is still a little different from the ideal denoised result. But by using a neighborhood of N*M pixels, if the number of pixels is large, the deviation from the true result is small. This small deviation from the true pixel value can be called low frequency noise. And because the deviation can be very small if enough pixels are taken into consideration using the spatial bilateral filter, the low frequency noise can be eliminated using another temporal IIR filter #115 (as shown in FIG. 1).

To eliminate the low frequency noise that remains after the operation of spatial bilateral filter #110, temporal IIR filter #115 can perform another filtering on the output of spatial bilateral filter #110 (namely, frame CF_S). The output of spatial bilateral filter #110 is labeled CF_S, to indicate that it has been spatially filtered. The operation of temporal IIR filter #115 is the same as temporal IIR filter #105 discussed above.

As with the output of temporal IIR filter #105, which was used to guide spatial bilateral filter #110 but was not directly spatially filtered, the output of temporal IIR filter #115 is not directly output. The reason is the same: to avoid introducing temporal artifacts. Instead, the output of temporal IIR filter #115 is used as temporal stable reference frames to eliminate the temporally unstable results (with low frequency noise) of the output of spatial bilateral filter #110 (namely, CF_S). The output of temporal IIR filter #115 can be labeled as CF_S_F (to indicate both spatial and temporal filtering). The output of temporal IIR filter #115 can then be used as a temporally stable reference to eliminate low frequency noise from frame CF_S. For each pixel, the absolute value of the difference between the pixel in frame CF_S and the corresponding pixel in frame CF_S_F can be computed, and compared with a threshold. If the difference exceeds the threshold, then the pixel value from frame CF_S can be used; otherwise, the pixel value from CF_S_F can be used. In equations:

$$\text{Pix\_diff}(i,j) = \text{abs}(\text{pix\_s}(i,j) - \text{pix\_s\_f}(i,j))$$

where pix_s(i, j) is the pixel from the output of spatial bilateral filter #110, and pix_s_f(i, j) is the pixel from the output of temporal IIR filter #115. Then:

If pix_diff(i, j)<THR, then select pix_s_f(i, j) as the output. Otherwise, if pix_diff(i, j)>=THR, then select pix_s (i, j) as the output.

The threshold value THR can be adaptive according to the noise level of the frame because the deviation is always larger in a frame with a larger noise level. In some embodiments of the invention, the threshold value can be a constant times the noise level ($Noise_\mu$). Empirical tests have shown that if the size of the neighborhood of spatial bilateral filter #110 is set to 15*15, even for a very noisy frame, the low frequency noise can be eliminated enough so that a very small threshold (e.g., below 4) can be used. In addition, the use of a small threshold value helps to avoid introducing temporal artifacts while eliminating low frequency noise. While using a threshold is the preferred embodiment, it should be obvious to those skilled in the art that a piece wise linear function can be used instead, among other possibilities.

In embodiments of the invention, the operation of temporal IIR filter #115, the motion vector calculations (described above with reference to FIGS. 3 and 7) can be repeated, if desired, to recalculate the refined motion vector. But there is no reason why the refined motion vectors calculated during the operation of temporal IIR filter #105 could not be reused in the operation of temporal IIR filter #115, if desired.

FIG. 14 shows a system capable of implementing embodiments of the invention. In FIG. 14, computer system #1405 is shown. Computer system #1405 conventionally includes a computer #1410, a monitor #1415, a keyboard #1420, and a mouse #1425. Optional equipment not shown in FIG. 14 can include a printer and other input/output devices. Also not shown in FIG. 14 are the conventional internal components of computer system #1405: e.g., a central processing unit, memory, file system, etc. A person of ordinary skill in the art will recognize that while FIG. 14 shows a computer system, computer system #1405 can readily be replaced be any other system that can support video denoising: for example, a server or a mobile device.

Computer system #1405 also includes selector #1430. As discussed above, the output of temporal IIR filter #115 can be used to guide the selection of pixels for the output of video denoising. Selector #1430 can perform this function.

The modules shown in FIGS. 1-14 can be implemented in any desired manner. For example, they can be implemented as software running on a computer system (such as that shown in FIG. 14) with an appropriate processor, or as specific hardware to implement the described algorithm.

FIG. 15 shows a flowchart of a procedure for using a temporal-spatial IIR filter to perform denoising. In FIG. 15, at block #1505, a temporal IIR filter is applied to input video data to produce a first reference frame (such as CF_F, described above). At block #1510, a spatial bilateral filter is applied to produce a second reference frame (such as CF_S, described above). As discussed above, the spatial bilateral filter does not convert the first reference frame into the second reference frame, but rather uses the first reference frame as a guide to produce the second reference frame from the original video frame. At block #1515, a second temporal IIR filter is applied to the second reference frame to produce a third reference frame (such as CF_S_F, described above). Finally, at block #1520, additional denoising is performed on the second reference frame (CF_S), guided by the third reference frame (CF_S_F).

FIG. 16 shows a flowchart of a procedure for performing temporal IIR filtering in the procedure of FIG. 15. In FIG. 16, at block #1605, a motion vector for a block of the current frame is refined. At block #1610, the mean and standard deviation (i.e., statistical information about the noise in the video data) of the noise are determined. At block #1615, pixel blending is performed. At block #1620, pixel postprocessing is performed.

FIG. 17 shows a flowchart of a procedure for performing motion vector refinement in the procedure of FIG. 16. In FIG. 17, at block #1705, a plurality of motion vectors are selected. As described above, the selected motion vectors can include both refined motion vectors and original (unrefined) motion vectors. At block #1710, the Sum of Absolute Differences (SAD) between frames for each motion vector are computed. At block #1715, a motion vectors with the smallest SAD is selected. At block #1720, an optical flow algorithm is applied to the selected motion vector. As shown by dashed arrow #1725, block #1720 is option and can be omitted.

FIG. 18 shows a flowchart of a procedure for calculating statistical variables about the noise in a frame of video data in the procedure of FIG. 16. In FIG. 18, at block #1805, the SADs between the current frame and the previous frame are computed. At block #1810, any SADs for covered or uncovered blocks are eliminated. At block #1815, any SAD outliers are eliminated. At block #1820, the mean and standard deviation (i.e., statistical information about the noise in the video data) are computed. As shown by dashed lines #1825 and #1830, blocks #1810 and #1815 are option and can be omitted.

FIG. 19 shows a flowchart of a procedure for performing pixel blending in the procedure of FIG. 16. In FIG. 19, at block #1905, clusters of motion vectors near a block are identified. At block #1910, the likelihood that the block belongs to each cluster is calculated. At block #1915, blending weights are calculated based on the likelihoods. At block #1920, the pixels in the block are blended using the blending weights.

FIG. 20 shows a flowchart of a procedure for performing pixel post-processing in the procedure of FIG. 16. In FIG. 20, at block #2005, the values of pixels at a border with another block are adjusted.

FIG. 21 shows a flowchart of a procedure for performing spatial filtering in the procedure of FIG. 15. In FIG. 21, at block #2105, a weight for each pixel around a central pixel is calculated. At block #2110, a value for the central pixel is calculated based on the surrounding pixels' weights and values.

FIG. 22 shows a flowchart of a procedure for performing additional denoising in the procedure of FIG. 15. In FIG. 22, at block #2205, an absolute difference between pixels in reference frames is calculated. At block #2210, a value for a pixel is selected from the reference frames.

Although the above description implies a specific order for steps in the algorithms, and suggests that certain blocks are required or optional, a persons killed in the art will recognize ways in which the sequence of blocks can be reordered without loss of function. In addition, a person skilled in the art will recognize that various blocks can be omitted without loss of functionality, whether or not specifically identified as optional.

By performing spatial bilateral filtering on the use unfiltered frame, but using the temporally IIR filtered results, embodiments of the invention improve on the prior art. In the prior art, the spatial filter could miss outliers of noise that it considered to be texture. In embodiments of the invention, these outliers are more readily identified and filtered. Then, by performing a second pass with the temporal IIR filter, any additional low frequency noise can be identified and filtered, but without introducing the temporal artifacts that might otherwise be introduced.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Such embodiments may also be referred to as program products. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may also be used in conjunction with communications media such antennas, wires, optical fibers, microwaves, radio waves, and other electromagnetic or optical carriers. Associated data may be delivered over transmission environments, including physical and/or logical networks, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "illustrated embodiment" or the like are used herein, these phrases are meant to generally reference embodiment possibilities, and are not intended to limit the invention to particular embodiment configurations. As used herein, these terms may reference the same or different embodiments that are combinable into other embodiments. Further, the various embodiments may be combined in any manner desired, to produce combinations not specifically discussed herein.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A method comprising:
   using a processor, applying a temporal Infinite Impulse Response filter to a current frame to generate a first reference frame;
   using the first reference frame to apply a temporal-guided spatial bilateral filter to the current frame to perform denoising on the current frame without introducing temporal artifacts, thereby producing a second reference frame;
   applying a temporal IIR filter to the second reference frame to produce a third reference frame; and
   using the second reference frame and the third reference frame to perform additional denoising on the second reference frame, thereby producing an output frame.

2. A method according to claim 1, wherein applying a temporal Infinite Impulse Response filter to a current frame includes:
   refining a motion vector for a block in the current frame;
   determining a mean and standard deviation of the current frame using at least a final refined motion vector for the block in the current frame;
   performing pixel blending on the block in the current frame; and
   performing pixel post-processing on the block in the current frame to produce the first reference frame.

3. A method according to claim 2, wherein refining a motion vector for a block in the current frame includes:
   selecting a plurality of motion vectors from an original motion vector field and a refined motion vector field, the plurality of motion vectors including at least one original motion vector and at least one refined motion vector; and
   selecting one of the plurality of motion vectors as a refined motion vector for the block in the current frame.

4. A method according to claim 3, wherein selecting one of the plurality of motion vectors as a refined motion vector for the block in the current frame includes:
   computing a sum of absolute differences between a previous frame and the current frame using each of the plurality of motion vectors; and
   selecting the one of the plurality of motion vectors with a smallest sum of absolute differences as a refined motion vector for the block in the current frame.

5. A method according to claim 3, wherein refining a motion vector for a block in the current frame further includes applying an optical flow algorithm to the refined motion vector to produce the final refined motion vector for the block in the current frame.

6. A method according to claim 2, wherein determining a mean and standard deviation of the current frame includes:
   calculating sums of absolute differences between blocks in the current frame and corresponding blocks in a previous frame;
   calculating the mean and standard deviation of the current frame from the sums of absolute differences between the blocks in the current frame and the corresponding blocks in the previous frame.

7. A method according to claim 6, wherein determining a mean and standard deviation of the current frame further includes eliminating sums of absolute differences for blocks that are covered or uncovered relative to the corresponding block in the previous frame.

8. A method according to claim 6, wherein determining a mean and standard deviation of the current frame further includes eliminating sums of absolute differences that are outliers.

9. A method according to claim 2, wherein performing pixel blending on the block in the current frame includes:
   identifying clusters of motion vectors for blocks in a neighborhood surrounding the block in the current frame;
   calculating a value representing a likelihood that the block in the current frame belongs with each cluster using at least the mean and standard deviation of the current frame;
   calculating a blending weight based on the value representing the likelihood that the block in the current frame belongs with each cluster; and
   blending the pixels in the block in the current frame using at least the blending weight.

10. A method according to claim 2, wherein performing pixel post-processing on the block in the current frame includes adjusting values for pixels in the block in the current frame at a border with another block in the current frame.

11. A method according to claim 1, wherein using the first reference frame to apply a temporal-guided spatial bilateral filter to the current frame to perform denoising on the current frame without introducing temporal artifacts includes:
    calculating a weight for each pixel in a neighborhood around a central pixel using a difference between each pixel in the neighborhood around the central pixel in the current frame and each corresponding pixel in a second neighborhood around a corresponding central pixel in the first reference frame; and
    calculating a value for the central pixel in the second reference frame based on a value for each pixel in the neighborhood around the central pixel and the weight for each pixel in the neighborhood around the central pixel.

12. A method according to claim 1, wherein using the second reference frame and the third reference frame to perform additional denoising on the second reference frame includes:
    calculating an absolute difference between a pixel in the second reference frame and a pixel in the third reference frame; and
    based on the absolute difference between the pixel in the second reference frame and the pixel in the third reference frame, selecting a value for the pixel for the output frame, the value for the pixel selected from a combination of a value of the pixel in the second reference frame and a value of the pixel in the third reference frame.

13. An article, comprising a non-transitory storage medium, said non-transitory storage medium having stored thereon instructions that, when executed by a processor, result in:
    using a processor, applying a temporal Infinite Impulse Response filter to a current frame to generate a first reference frame;
    using the first reference frame to apply a temporal-guided spatial bilateral filter to the current frame to perform denoising on the current frame without introducing temporal artifacts, thereby producing a second reference frame;
    applying a temporal IIR filter to the second reference frame to produce a third reference frame; and
    using the second reference frame and the third reference frame to perform additional denoising on the second reference frame, thereby producing an output frame.

14. An article according to claim 13, wherein applying a temporal Infinite Impulse Response filter to a current frame includes:
- refining a motion vector for a block in the current frame;
- determining a mean and standard deviation of the current frame using at least a final refined motion vector for the block in the current frame;
- performing pixel blending on the block in the current frame; and
- performing pixel post-processing on the block in the current frame to produce the first reference frame.

15. An article according to claim 13, wherein using the first reference frame to apply a temporal-guided spatial bilateral filter to the current frame to perform denoising on the current frame without introducing temporal artifacts includes:
- calculating a weight for each pixel in a neighborhood around a central pixel using a difference between each pixel in the neighborhood around the central pixel in the current frame and each corresponding pixel in a second neighborhood around a corresponding central pixel in the first reference frame; and
- calculating a value for the central pixel in the second reference frame based on a value for each pixel in the neighborhood around the central pixel and the weight for each pixel in the neighborhood around the central pixel.

16. An article according to claim 13, wherein using the second reference frame and the third reference frame to perform additional denoising on the second reference frame includes:
- calculating an absolute difference between a pixel in the second reference frame and a pixel in the third reference frame; and
- based on the absolute difference between the pixel in the second reference frame and the pixel in the third reference frame, selecting a value for the pixel for the output frame, the value for the pixel selected from between a value of the pixel in the second reference frame and a value of the pixel in the third reference frame.

* * * * *